(12) United States Patent
Otsuki et al.

(10) Patent No.: US 12,179,403 B2
(45) Date of Patent: Dec. 31, 2024

(54) MOLDING MACHINE MANAGEMENT SYSTEM

(71) Applicant: Seiko Epson Corporation, Tokyo (JP)

(72) Inventors: Yoshiaki Otsuki, Matsumoto (JP); Yusuke Mitsuma, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 321 days.

(21) Appl. No.: 17/716,270

(22) Filed: Apr. 8, 2022

(65) Prior Publication Data

US 2022/0324149 A1    Oct. 13, 2022

(30) Foreign Application Priority Data

Apr. 9, 2021    (JP) ................. 2021-066369

(51) Int. Cl.
  *B29C 45/76*    (2006.01)
  *B29C 45/17*    (2006.01)

(52) U.S. Cl.
  CPC .......... *B29C 45/76* (2013.01); *B29C 45/1774* (2013.01); *B29C 2045/7606* (2013.01); *B29C 2945/7607* (2013.01); *B29C 2945/76073* (2013.01); *B29C 2945/76076* (2013.01)

(58) Field of Classification Search
  CPC .... B29C 45/76; B29C 45/1774; G06Q 10/06; G06Q 10/0631; G06Q 10/06311; G06Q 10/06312; G06Q 50/04; G06F 16/26
  See application file for complete search history.

(56) References Cited

U.S. PATENT DOCUMENTS

| 2004/0148136 | A1  | 7/2004  | Sasaki et al. |
| 2008/0184114 | A1* | 7/2008  | Hano ..................... B29C 45/76 715/700 |
| 2014/0316602 | A1* | 10/2014 | Kawai ...................... G05F 1/66 700/297 |
| 2015/0077800 | A1* | 3/2015  | Yamagishi ......... G06Q 30/0621 358/1.15 |
| 2015/0097840 | A1* | 4/2015  | Nishimura ......... G06Q 10/0639 345/443 |
| 2018/0191988 | A1* | 7/2018  | Takahashi ............. H04N 7/181 |
| 2019/0034130 | A1* | 1/2019  | Tajima .................. G06F 3/1207 |
| 2019/0050773 | A1* | 2/2019  | Watanabe ........ G06Q 10/06315 |
| 2020/0184692 | A1* | 6/2020  | Yang .................. G05B 19/4155 |

(Continued)

FOREIGN PATENT DOCUMENTS

| CN | 111788531 A   | 10/2020 |
| JP | 2004-164023 A | 6/2004  |

*Primary Examiner* — Nicholas Klicos
(74) *Attorney, Agent, or Firm* — Harness, Dickey & Pierce, P.L.C.

(57) ABSTRACT

A molding machine management system includes a display section configured to display, along a common time axis, identification indicators for identifying a component B, which is a first molded article, and a component C, which is a second molded article, produced after the component B, a production result for the component B including a molding result period and an arrangement result period for the component B, and a production plan for the component C including a molding planned period and an arrangement planned period for the component C and display the production result for the component B and the production plan for the component C in parallel on the common time axis.

8 Claims, 5 Drawing Sheets

(56) References Cited

U.S. PATENT DOCUMENTS

2020/0368953 A1\* 11/2020 Komiya ................ B29C 45/768
2021/0011463 A1    1/2021 Koh et al.
2021/0125125 A1\*  4/2021 Doi .................. G06Q 10/06313

\* cited by examiner

FIG. 4

| OPERATION STATE | A2 SMALL MOLDING MACHINE NAME MACHINE A | | | | A6 | |
|---|---|---|---|---|---|---|
| | PRODUCTION PROGRESS RATIO (%) 61 | EQUIPMENT OVERALL EFFICIENCY (%) 62 | OPERATION RATIO (%) 63 | DEFECT RATIO IN PROCESS (ppm) 64 | MATERIAL RESIDUAL AMOUNT (%) 65 | |
| | 98.7 | 75.2 | 90.5 | 1200 | MATERIAL A 85 / MATERIAL B 73 | |

PRODUCTION STATE

| MOLDED ARTICLE | PRODUCTION RATIO (%) 53 | DEFECT RATIO (ppm) 54 | CYCLE TIME (sec) 55 | QUANTITY (pcs) 52 |
|---|---|---|---|---|
| COMPONENT A | 100 | 1200 | 15.1 | 11150 / 11150 |
| COMPONENT B | 15 | 0 | 12.0 | 5000 / 750 |
| COMPONENT C | 0 | 0 | 0 | 4000 / 0 |

2021/04/01

HOUR: 00 01 02 03 04 05 06 07 08 09 10 11 12 13 14 15 16 17 18 19 20 21 22 23

MOLDING MACHINE MANAGEMENT SYSTEM

The present application is based on, and claims priority from JP Application Serial Number 2021-066369, filed Apr. 9, 2021, the disclosure of which is hereby incorporated by reference herein in its entirety.

BACKGROUND

1. Technical Field

The present disclosure relates to a molding machine management system.

2. Related Art

As described in JP-A-2004-164023 (Patent Literature 1), there has been known a management support system including a display screen on which a bar indicator for performing color-coded display for an operation state of an injection molding machine up to the present date and time and a bar indicator for performing color-coded display for a switching state of a manufactured product are provided.

However, in the management support system described in Patent Literature 1, an operator cannot grasp an operation state of peripheral equipment that supports the injection molding machine and a production plan for the injection molding machine after the present date and time. Accordingly, it is likely that the operator cannot appropriately cope with the operation state of the peripheral equipment and the production plan for the injection molding machine and work efficiency is deteriorated. Therefore, there has been a demand for a management support system that can let the operator know the operation state of the peripheral equipment and the production plan for the injection molding machine.

SUMMARY

A molding machine management system performs production management for an injection molding machine that produces a first molded article and a second molded article produced after the first molded article, and the molding machine management system includes a display section configured to display, along a common time axis, identification indicators for identifying the first molded article and the second molded article, a production result for the first molded article including a molding result period for the first molded article and an arrangement result period for the first molded article, and a production plan for the second molded article including a molding planned period for the second molded article and an arrangement planned period for the second molded article and display the production result for the first molded article and the production plan for the second molded article in parallel on the common time axis.

BRIEF DESCRIPTION OF THE DRAWINGS

FIG. 4 is an explanatory diagram showing an example of a management screen displayed by a display section according to a third embodiment.

DESCRIPTION OF EXEMPLARY EMBODIMENTS

1. First Embodiment

A molding machine management system 1 according to a first embodiment is explained with reference to FIGS. 1 and 2.

Figure 1:
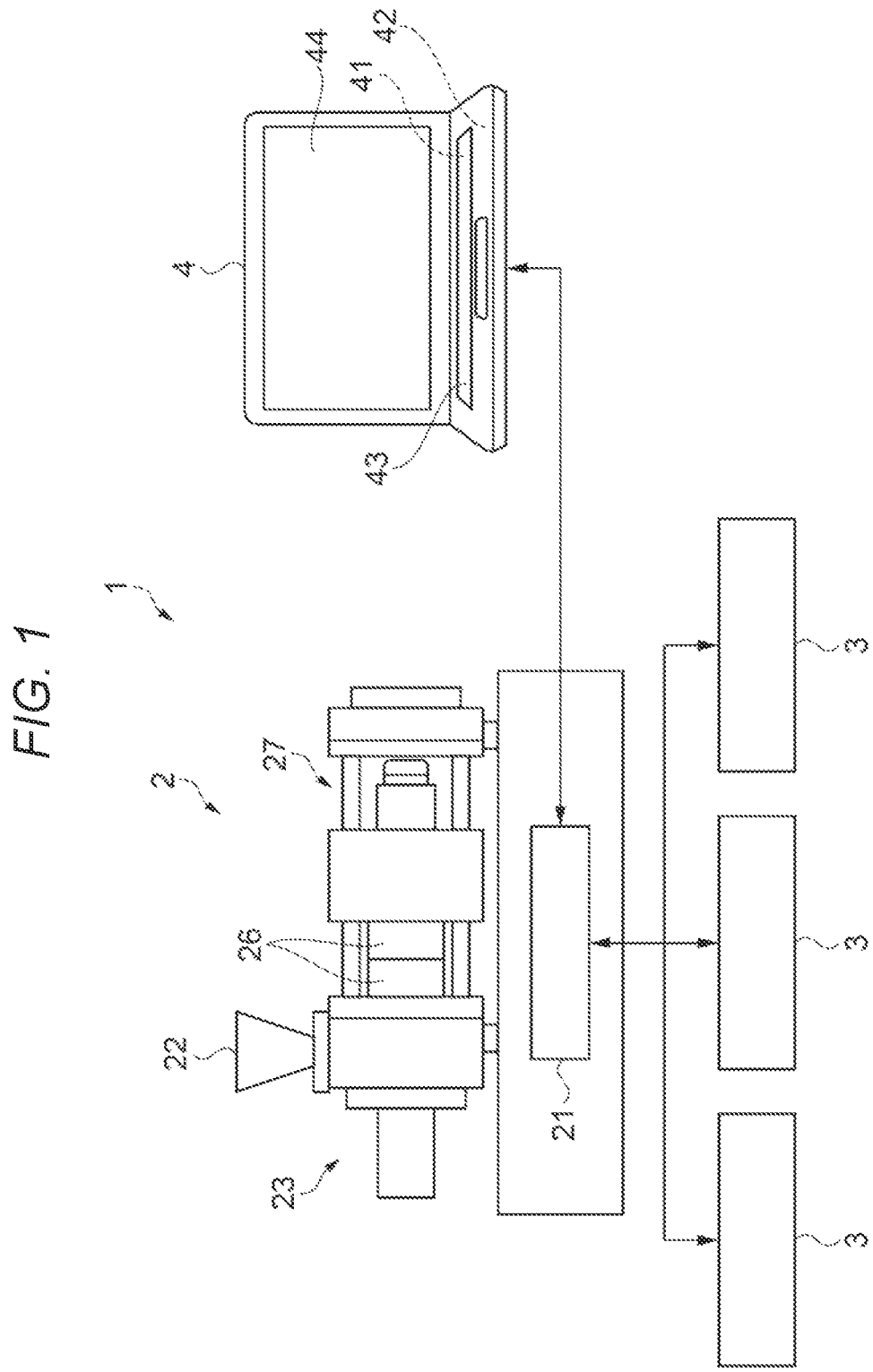
FIG. 1 is an explanatory diagram of a molding machine management system according to a first embodiment.

As shown in FIG. 1, the molding machine management system 1 includes an injection molding machine 2, peripheral equipment 3 that supports the injection molding machine 2, and a management device 4. The injection molding machine 2 and the management device 4 are communicably connected. The injection molding machine 2 and the peripheral equipment 3 are communicably connected. Consequently, the management device 4 and the peripheral equipment 3 are communicably connected via the injection molding machine 2. Although the management device 4 and the peripheral equipment 3 are communicably connected via the injection molding machine 2 in this embodiment, the management device 4 and the peripheral equipment 3 may be communicably connected not via the injection molding machine 2. Although the injection molding machine 2 and the peripheral equipment 3 are communicably connected in this embodiment, the injection molding machine 2 and the peripheral equipment 3 may not be communicably connected. Although one injection molding machine 2 is communicably connected to the management device in this embodiment, a plurality of injection molding machines 2 may be communicably connected to the management device 4.

The injection molding machine 2 includes a molding control section 21, a hopper 22, which is a material storage section, an injecting section 23, a mold section 26 having a cavity, and a mold clamping section 27 that clamps the mold section 26.

The hopper 22 stores a material in a state of pellet or powder and supplies the material to the injecting section 23.

The injecting section 23 includes a not-shown impeller having a shape such as a swirl shape or a screw shape and a not-shown heating section. The injecting section 23 plasticizes the material supplied from the hopper 22 and injects a predetermined amount of the plasticized material into the mold section 26.

The mold section 26 has the cavity, which is a space in which the material injected from the injecting section 23 is filled. The mold section 26 may be made of metal, may be made of ceramic, or may be made of resin. The mold section 26 made of metal is called metal mold.

The mold clamping section 27 clamps the mold section 26 not to be opened by a filling pressure at the time when the material injected from the injecting section 23 is filled in the cavity.

The molding control section 21 has a function of controlling the operation of the entire injection molding machine 2 and executing injection molding and a function of performing communication with the peripheral equipment 3 and the management device 4 via a not-shown interface.

According to a molding program stored by the management device 4 explained below, the molding control section 21 controls the injecting section 23 to inject, into the mold section 26, the material supplied from the hopper to the injecting section 23 and controls the mold clamping section 27 to clamp the mold section 26 to thereby mold a molded product having a shape corresponding to the shape of the cavity of the mold section 26.

The molding program is a program for performing the injection molding once in the injection molding machine 2. Molding conditions such as timings for changing control values for the injecting section 23, the mold clamping section 27, and the like and magnitudes of the control values are designated in the molding program.

The molding control section 21 executes the molding program by the number of times corresponding to a scheduled number of produced articles set in advance in a production plan for a molded product produced by the injection molding machine 2 and performs the injection molding to thereby mold the molded product by the scheduled number of produced articles. In this embodiment, one injection molding cycle is referred to as one shot and a unit time from a start to an end of the one injection molding cycle is referred to as cycle time (sec/shot). Executing the molding program by the number of times corresponding to the scheduled number of produced articles and molding the molded product by the scheduled number of produced articles is referred to as one job.

The molding control section 21 has a function of acquiring various time series data concerning the injection molding using not-shown various sensors provided in the injection molding machine 2, for example, a weight sensor for detecting the weight of the material stored in the hopper 22, a pressure sensor for detecting the pressures of, for example, gas in the injecting section 23 and the material in the mold section 26, and a temperature sensor for detecting the temperatures of the injecting section 23, the mold section 26, and the like. The time series data is data obtained by continuously or intermittently acquiring detection values of the various sensors in a predetermined period. Such acquisition of the various time series data is performed in any injection molding machine. Therefore, detailed explanation of the acquisition of the various time series data is omitted.

The various time series data concerning the injection molding acquired by the molding control section 21 are transmitted from the molding control section 21 to the management device 4.

The peripheral equipment 3 is equipment that supports the injection molding machine 2. Examples of the peripheral equipment 3 include a drier, a temperature controller, an inspection device, a working machine, and a conveying device. The drier is used to dehumidify and dry the material before the material is supplied to the injection molding machine 2. The temperature controller is used to adjust the temperature of the mold section 26. The inspection device is, for example, an image inspection device and is used to determine, with an exterior inspection using images of molded products, for each of the molded products, presence or absence of an abnormality in an exterior. The working machine is used to remove burrs and the like of the molded product. The conveying device is, for example, a robot arm and is used to take out the molded product from the mold section 26 and convey the molded product to the working machine. The peripheral equipment 3 and the injection molding machine 2 may be configured independently from each other or may be configured integrally.

Not-shown various sensors for detecting an operation state of the peripheral equipment 3 are provided in the peripheral equipment 3. For example, temperature sensors for detecting the temperature in the drier and the temperature of a heat medium of the temperature controller are provided in the drier and the temperature controller, which are the peripheral equipment 3. Time series data concerning the operation state of the peripheral equipment 3 acquired by the not-shown various sensors provided in the peripheral equipment 3 is transmitted to the molding control section 21 of the injection molding machine 2 via a not-shown interface. The time series data concerning the operation state of the peripheral equipment 3 is transmitted from the molding control section 21 to the management device 4.

The management device 4 includes a control section 41, a storing section 42, an operation section 43, and a display section 44. As the management device 4, an information processing device such as a computer can be used. In this embodiment, the management device 4 and the injection molding machine 2 are provided independently from each other. However, the management device 4 does not need to be provided independently from the injection molding machine 2. The management device 4 and the injection molding machine 2 may be configured integrally. For example, the molding machine management system 1 can also be realized by using, as the management device 4, the molding control section 21 originally included in the injection molding machine 2 and a not-shown display section, a not-shown operation section, and a not-shown storing section originally included in the injection molding machine 2.

The control section 41 has a function of receiving the various time series data concerning the injection molding transmitted from the injection molding machine 2 and the various time series data concerning the operation state of the peripheral equipment 3 transmitted from the peripheral equipment 3 and storing the time series data in the storing section 42, a function of reading, from the storing section 42, the molding program stored in the storing section 42 and transmitting the molding program to the injection molding machine 2, and a function of storing, in the storing section 42, a molding program created by an operator operating the operation section 43.

As the control section 41, for example, an integrated circuit such as a CPU (Central Processing Unit) or an MPU (Micro Processing Unit) can be used.

The storing section 42 stores the various time series data concerning the injection molding, the various time series data concerning the operation state of the peripheral equipment 3, a molding program for the injection molding machine 2 to execute the injection molding, and various data concerning a production plan of molded products to be produced by the injection molding machine 2. The various data concerning the production plan of the molded products to be produced by the injection molding machine 2 is, for example, a scheduled number of produced articles, a cycle time, and the like of the molded products to be produced by the injection molding machine 2.

The molding program is created for each of molded articles indicating types of the molded products according to the specifications of the molded article. In this embodiment, a corresponding relation between the molded article and the molding program is stored in the storing section 42 as a database.

As the storing section 42, for example, a volatile memory such as a RAM (Random Access Memory), a nonvolatile memory such as a ROM (Read Only Memory), and a detachable external storage device can be used.

The operation section 43 transmits an operation signal to the control section 41 based on input operation, selection operation, screen transition operation, or the like by the operator. The control section 41 performs, based on the operation signal transmitted from the operation section 43, various kinds of processing for, for example, changing display content of the display section 44.

As the operation section 43, for example, a keyboard, a mouse, and a touch panel can be used.

The display section 44 displays, according to control by the control section 41, various screens, for example, a screen for the operator to create a molding program, a screen for the operator to view a production plan and a production result of the injection molding machine 2, and a screen for the operator to input an operation state of the peripheral equipment 3.

As the display section 44, for example, a liquid crystal display can be used. Like a touch panel display, the display section 44 and the operation section 43 may be integrated.

Figure 2:
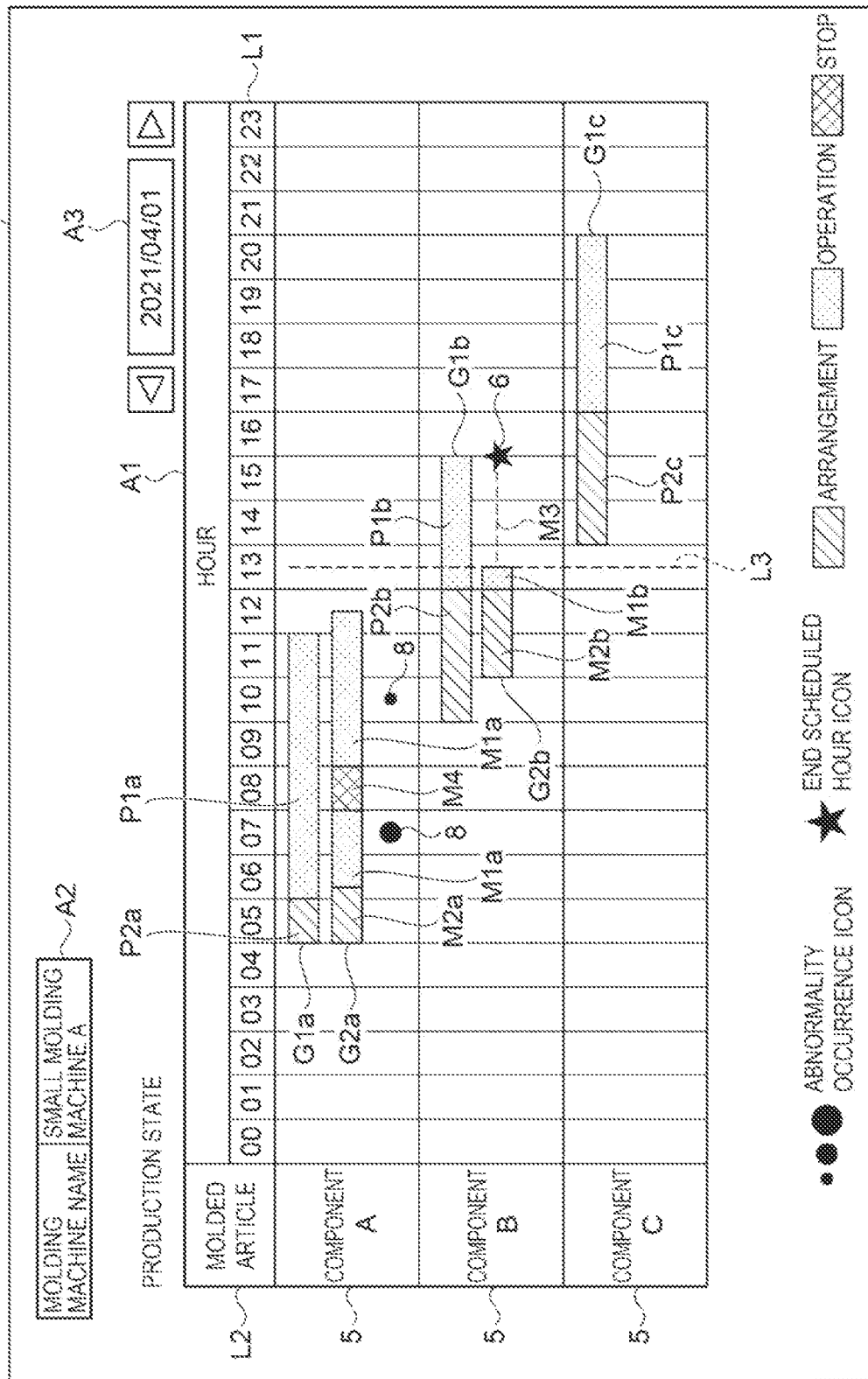
FIG. 2 is an explanatory diagram showing an example of a management screen displayed by a display section according to the first embodiment.

As shown in FIG. 2, the display section 44 displays a management screen W1 for managing the production plan and the production result of the injection molding machine 2. The operator can grasp the production plan and the production result of the injection molding machine 2 by viewing the management screen W1.

The management screen W1 includes a production state display region A1 for displaying the production plan and the production result of the injection molding machine managed by the operator, a molding machine selection region A2 for selecting the injection molding machine 2 managed by the operator, and a date selecting region A3 for selecting a date for displaying the production plan and the production result of the injection molding machine 2 managed by the operator.

In this embodiment, the operator operates the operation section 43 of the management device 4 to input a name of the injection molding machine 2 managed by the operator to the molding machine selection region A2 and input a date to the date selection region A3. Consequently, a production plan and a production result on the date input to the date selection region A3 of the injection molding machine 2 input to the molding machine selection region A2 is displayed in the production state display region A1. In this embodiment, the date input to the date selection region A3 is the present date. In this way, as various character strings and numerical values such as the name of the injection molding machine 2 and the date in FIG. 2, character strings and numerical values different from actual character strings and actual numerical values are sometimes displayed in order to clearly explain the present disclosure. The present date may be automatically displayed in the date selection region A3.

The production state display region A1 is a region where the display section 44 displays the production plan and the production result of the injection molding machine 2 for each of the molded articles produced by the injection molding machine 2.

The production state display region A1 is specifically explained.

The production state display region A1 is a graph display region having a common time axis L1 for displaying the production plan and the production result of the injection molding machine 2 according to elapse of time and a molded article axis L2 for displaying the production plan and the production result of the injection molding machine 2 for each of the molded articles. In the production state display region A1, the present hour is displayed by a present hour display line L3. FIG. 2 is an example of a case in which the present hour is time between 13:00 and 14:00.

In this embodiment, a start point and an end point of the common time axis L1 are displayed based on a predetermined hour. Specifically, the start point of the common time axis L1 is 0:00 indicating 0:00 am and the end point of the common time axis L1 is 24:00 indicating 12:00 pm. A time range displayed by the common time axis L1 is twenty-four hours from 0:00 am to 12:00 μm. In other words, the start point and the end point of the common time axis L1 are fixed in the production state display region A1. The present hour display line L3 moves along the common time axis L1 according to elapse of time.

The time range displayed by the common time axis L1 is not limited to twenty-four hours and may be a time range shorter than twenty-four hours or a time range longer than twenty-four hours. The operator may be able to optionally set an hour, which is a start point of the time range displayed by the common time axis L1. In this embodiment, the hour, which is the start point of the time range displayed by the common time axis L1, is 0:00 am. However, not only this, but, for example, the hour, which is the start point of the time range displayed by the common time axis L1, may be set as 5:00 am and a time range from 5:00 am of the day to 5:00 am of the next day may be set as the time range displayed by the common time axis L1.

The molded article axis L2 displays identification indicators 5 for identifying molded articles produced by the injection molding machine 2. In this embodiment, the identification indicators 5 for identifying the molded articles are names of the molded articles and are three types of "component A", "component B", and "component C". When a first molded article in the present disclosure is the component A, a second molded article produced after the component A, which is the first molded article, is equivalent to the component B. Similarly, when the first molded article in the present disclosure is the component B, the second molded article produced after the component B, which is the first molded article, is equivalent to the component C. The identification indicators 5 for identifying the molded articles are not limited to the names of the molded articles and may be indicators capable of identifying the molded articles such as jobs of the injection molding machine 2. The identification indicators 5 for identifying the molded articles are not limited to the three types and may be one type, two types, or four or more types.

In the production state display region A1, a production plan G1a for the component A, a production plan G1b for the component B, and a production plan G1c for the component C, which are production plans for each of the molded articles, and a production result G2a for the component A and a production result G2b for the component B, which are production results for each of the molded articles, are displayed to correspond to the common time axis L1 and the molded article axis L2. The production plans G1a, G1b, and G1c for each of the molded articles and the production results G2a and G2b for each of the molded articles are displayed along the common time axis L1. Specifically, the production plans G1a, G1b, and G1c for each of the molded articles and the production results G2a and G2b for each of the molded articles are respectively displayed as bar graphs along the common time axis L1. The production results G2a and G2b for each of the molded articles are production results up to the present hour. In this embodiment, since production of the component C is not started at the present hour, a production result for the component C is not displayed.

As explained above, in this embodiment, the display section 44 displays the production plans G1a, G1b, and G1c for each of the molded articles and the production results G2a and G2b for each of the molded articles along the common time axis L1. Consequently, the molding machine management system 1 can let the operator know the production plans G1a, G1b, and G1c and the production results G1a and G2b of the injection molding machine 2. The operator can easily grasp production states for each of the molded articles.

The production plan G1a for the component A includes a molding planned period P1a and an arrangement planned period P2a. Similarly, the respective production plans G1b and G1c for the component B and the component C respectively include molding planned periods P1b and P1c and arrangement planned periods P2b and P2c. The molding planned periods P1a, P1b, and P1c are periods in which it is planned in advance that the operator operates the injection molding machine 2 to thereby perform molding of molded products corresponding to the component A, the component B, and the component C, which are the respective molded articles. In FIG. 2, the molding planned periods P1a, P1b, and P1c are displayed in meshing by halftone dots. The arrangement planned periods P2a, P2b, and P2c are periods in which it is planned in advance that the operator performs arrangement of the molding of the molded products corresponding to the respective molded articles. In FIG. 2, the arrangement planned periods P2a, P2b, and P2c are displayed in meshing by lines slanting upward to the right. In this way, the molding planned periods P1a, P1b, and P1c and the arrangement planned periods P2a, P2b, and P1c are displayed in different display forms. The display in the meshing of different kinds is an example of the different display forms. The different display forms are not limited to the kinds of the meshing. Colors, shapes, or the like may be differentiated.

The production results G1a and G2b for each of the molded articles respectively include molding result periods M1a and M1b and arrangement result periods M2a and M2b. The molding result periods M1a and M1b are periods in which the operator operates the injection molding machine 2 to thereby perform the molding of the molded products corresponding to the respective molded articles. In FIG. 2, the molding result periods M1a and M1b are displayed in meshing by halftone dots. The arrangement result periods M2a and M2b are periods in which the operator performed arrangement of the molding of the molded products corresponding to the respective molded articles. In FIG. 2, the arrangement result periods M2a and M2b are displayed in meshing by lines slanting upward to the right. In this way, the molding result periods M1a and M1b and the arrangement result periods M2a and M2b are displayed in different display forms. The different display forms are not limited to kinds of the meshing. Colors, shapes, or the like may be differentiated.

In the present disclosure, the "arrangement" is work other than molding of molded products among kinds of work generated to perform the molding of the molded products and is a concept including pre-arrangement performed before the molding of the molded products and post-arrangement performed after the molding of the molded products. The "arrangement" includes work that the operator performs on the peripheral equipment 3 besides work that the operator performs on the injection molding machine 2. Examples of the pre-arrangement include work such as drying of a material by a drier, which is the peripheral equipment 3, attachment of a temperature controller, which is the peripheral equipment 3, attachment of the mold section 26 to the injection molding machine 2, temperature raising of the mold section 26, and purge of the injection molding machine 2. Examples of the post-arrangement include work such as temperature lowering of the mold section 26, detachment of the mold section 26, and detachment of the temperature controller. The arrangement planned periods P2a, P2b, and P2c in this embodiment are specifically periods in which the pre-arrangement is planned. The arrangement result periods M2a and M2b are specifically periods in which the pre-arrangement was performed.

In this way, the display section 44 displays the arrangement planned periods P2a, P2b, and P2c and the arrangement result periods M2a and M2b including the work on the peripheral equipment 3. Consequently, the molding machine management system 1 can let the operator know an operation state of the peripheral equipment 3. The operator can appropriately cope with not only the injection molding machine 2 but also the peripheral equipment 3. Therefore, work efficiency is improved.

As shown in FIG. 2, the display section 44 displays the production result G2b for the component B, which is the first molded article, and the production plan G1c for the component C, which is the second molded article produced after the first molded article, in parallel to each other on the common time axis L1. Similarly, the display section 44 displays the production result G1a for the component A, which is the first molded article with respect to the component B, and the production plan G1b for the component B, which is the second molded article with respect to the component A, in parallel to each other on the common time axis L1.

The production result G2b for the component B, which is the first molded article with respect to the component C, and the production plan G1c for the component C, which is the second molded article with respect to the component B, are displayed in parallel on the common time axis L1 in this way, whereby the operator can easily grasp the production plan G1c, which is a production plan after the present date and time. Therefore, the operator can take appropriate measures temporally in parallel respectively according to progress states of work of a plurality of molded articles, for example, perform arrangement for the component C, which is the second molded article, produced after the component B in parallel to molding of the component B, which is the first molded article. Therefore, work efficiency is improved.

The production result G2b for the component B, which is the first molding article with respect to the component C, includes a molding scheduled period M3 for the component B, which is the first molding article. The molding scheduled period M3 indicates, about the component B on which molding is performed at the present hour, a time until a molding end scheduled hour when the molding of the component B ends. The molding end scheduled hour when the molding of the component B ends can be calculated based on, for example, a scheduled number of produced articles set in advance in the production plan G1b for the component B, the number of produced articles of the component B at the present hour, and a cycle time required for the molding of the component B.

In FIG. 2, the molding scheduled period M3 is a period from the present hour indicated by the present hour display line L3 until the molding end scheduled hour for the component B indicated by a star-shaped end scheduled hour icon 6 and is indicated by a broken line. As explained above, the molding result period M1b for the component B is displayed in the meshing by the halftone dots. The molding result period M1b and the molding scheduled period M3 are displayed in different display forms. The different display forms are not limited to this and colors or the like may be differentiated. In this embodiment, the component B is explained. However, molding scheduled periods can be displayed about the component A and the component C in the same manner as about the component B.

In this way, the display section 44 displays the molding result period M1*b* for the component B, which is the first molding article, and the molding scheduled period M3 for the component B, which is the first molding article, in the different display forms. Consequently, the operator can visually easily and surely distinguish the molding result period M1*b* and the molding scheduled period M3. Therefore, it is easier to grasp a production state of the component B, which is the molded article formed at the present hour. Therefore, work efficiency is improved.

The display section 44 displays the production result G2*b* for the component B including the molding scheduled period M3 for the component B and the production plan G1*c* for the component C produced after the component B in parallel to each other on the common time axis L1. Consequently, the operator can easily grasp a temporal relation between the molding scheduled period M3 for the component B and the production plan G1*c* for the component C produced after the component B. Therefore, when work of a plurality of molded articles is performed temporally in parallel, for example, the arrangement for the component C, which is the second molded article, produced after the component B is performed in parallel to the molding of the component B, which is the first molded article, the operator can take more appropriate measures according to progress states of the work of the respective molded articles. Therefore, work efficiency is further improved.

As shown in FIG. 2, the display section 44 displays the production plan G1*a* for the component A, which is the first molded article, and the production plan G1*b* for the component B, which is the second molded article produced after the first molded article, in parallel to each other on the common time axis L1. Similarly, the display section 44 displays the production plan G1*b* for the component B, which is the first molded article with respect to the component C, and the production plan G1*c* for the component C, which is the second molded article with respect to the component B, in parallel to each other on the common time axis L1.

In this way, the production plan G1*a* for the component A, the production plan G1*b* for the component B produced after the component A, and the production plan G1*c* for the component C produced after the component B are displayed in parallel to one another on the common time axis L1. Consequently, the molding machine management system 1 can let the operator know the production plans G1*a*, G1*b*, and G1*c* for each of the molded articles including a temporal anteroposterior relation of the production plans G1*a*, G1*b*, and G1*c*. Therefore, the operator can easily grasp the production plans G1*b* and G1*c*, which are production plans after the present date and time, and can take appropriate measures temporally in parallel respectively according to progress states of work of a plurality of molded articles, for example, perform arrangement for the component B, which is the second molded article, produced after the component A in parallel to molding of the component A, which is the first molded article. Therefore, work efficiency is improved.

As shown in FIG. 2, the production result G1*a* for the component A, which is the first molded article with respect to the component B, includes the molding result period M1*a* equivalent to a molding machine operation period in which the injection molding machine 2 operates and a molding machine stop period M4 in which the injection molding machine 2 stops. The molding machine stop period M4 indicates a time in which the injection molding machine 2 is abnormally stopped because an abnormality occurs in the injection molding machine 2 or the peripheral equipment 3. The abnormal stop occurs, for example, when data indicating an abnormality is transmitted to the management device 4 from not-shown various sensors included in the injection molding machine 2 and the peripheral equipment 3 and the management device 4 transmits a stop instruction to the injection molding machine 2 or when the operator finds an abnormality of the injection molding machine 2 or the peripheral equipment 3 and manually stops the injection molding machine 2.

In FIG. 2, the molding machine stop period M4 in which the injection molding machine 2 stops is displayed in meshing by a slanted lattice. As explained above, in the production result G1*a* for the component A, which is the first molded article, the molding result period M1*a* equivalent to the molding machine operation period in which the injection molding machine 2 operates is displayed in the meshing by the halftone dots. The molding result period M1*a* equivalent to the molding machine operation period and the molding machine stop period M4 are displayed in different display forms. The different display forms are not limited to the kinds of the meshing. Colors, shapes, or the like may be differentiated. In this embodiment, the component A is explained. However, a molding machine stop period can be displayed about the component B and the component C in the same manner as about the component A.

In this way, in the production result G2*a* for the component A, which is the first molded article, the display section 44 displays, in the different display forms, the molding result period M1*a* equivalent to the molding machine operation period in which the injection molding machine 2 operates and the molding machine stop period M4 in which the injection molding machine 2 stops. Consequently, the operator can take appropriate measures according to an abnormal stop of the injection molding machine 2. For example, in preparation for a case in which the same abnormality as an abnormality that occurs in the molding machine stop period M4 occurs again, the operator can prepare tools necessary for restoration or inspection in advance and check stocks of replacement components.

As shown in FIG. 2, on the lower side of the production results G2*a* and G2*b* for each of the molded articles, a space for displaying an abnormality occurrence icon 8 displayed when an abnormality occurs in the injection molding machine 2 is provided to correspond to the common time axis L1. In this embodiment, as the abnormality occurrence icon 8, round icons having three sizes can be displayed according to degrees of abnormality occurrence. A not-shown cursor operated by the operation section 43 may be displayed on the display section 44. When the not-shown cursor is placed on the abnormality occurrence icon 8, specific content of abnormality occurrence may be able to be displayed.

As explained above, according to this embodiment, effects described below can be obtained.

The molding machine management system 1 is the molding machine management system 1 that performs production management for the injection molding machine 2 that produces the component B, which is the first molded article, and the component C, which is the second molded article, produced after the product B, which is the first molded article, the molding machine management system 1 including the display section 44 that displays, along the common time axis L1, the identification indicators 5 for identifying the component B and the component C, the production result G2*b* for the component B including the molding result period M1b for the component B and the arrangement result period M2b for the component B, and the production plan G1c for the component C including the molding planned period P1c for the component C and the arrangement planned period P1c for the component C and displays the production result G2b for the component B and the production plan G1c for the component C in parallel on the common time axis L1.

Consequently, the molding machine management system 1 can let the operator know an operation state of the peripheral equipment 3 that supports the injection molding machine 2 and the production plan G1c of the injection molding machine 2 after the present date and time. Accordingly, the operator can appropriately take measures according to the operation state of the peripheral equipment 3 and the production plan G1c of the injection molding machine 2 after the present date and time. Therefore, work efficiency is improved.

In this embodiment, as explained above, the three molded articles, that is, the component A, the component B, and the component C are displayed on the molded article axis L2. Specifically, on the molded article axis L2, the three molded articles, that is, the component A, the component B, and the component C are placed in ascending order of production start times of the respective production plans G1a, G1b, and G1c for the component A, the component B, and the component C. However, on the molded article axis L2, the order of placing the three molded articles, that is, the component A, the component B, and the component C is not limited to this. The molded article for which molding of a molded product is started at the present hour or the molded article for which arrangement is stared at the present hour may be placed first on the molded article axis L2. By displaying the molded articles in this way, the operator can easily grasp a work plan and a work result of the molded article for which work is performed at the present hour. Therefore, work efficiency is improved.

The operator may be able to scroll and display, in a direction along the molded article axis L2, the production plans G1a, G1b, and G1c and the production results G2a and G2b for each of the molded articles displayed in the production state display region A1 by operating the operation section 43. By displaying the production plans G1a, G1b, and G1c and the production results G2a and G2b for each of the molded articles in this way, even when the number of molded articles that can be simultaneously displayed in the production state display region A1 is limited, the operator can easily grasp production plans and production results of a large number of molded articles by moving the molded articles displayed in the production state display region A1 in the direction along the molded article axis L2.

In this embodiment, the production plans G1a, G1b, and G1c and the production results G2a and G2b in the date input to the date selection region A3 are displayed in the production state display region A1 as explained above. However, the operator may be able to scroll and display, in a direction along the common time axis L1, the production plans and the production results for each of the molded articles displayed in the production state display region A1 by operating the operation section 43. By displaying the production plans and the production results for each of the molded articles in this way, for example, the operator can easily grasp production plans and production results of molded articles produced in the past.

2. Second Embodiment

A management screen W1a displayed by the display section 44 of the molding machine management system 1 according to a second embodiment is explained with reference to FIG. 3. The same components as the components in the first embodiment are denoted by the same reference numerals and signs and explanation of the components is omitted. The management screen W1a according to the second embodiment is the same as the management screen W1 in the first embodiment except that a basis for displaying a start point of a common time axis L1a and an end point of the common time axis L1a is different from the basis in the first embodiment.

Figure 3:
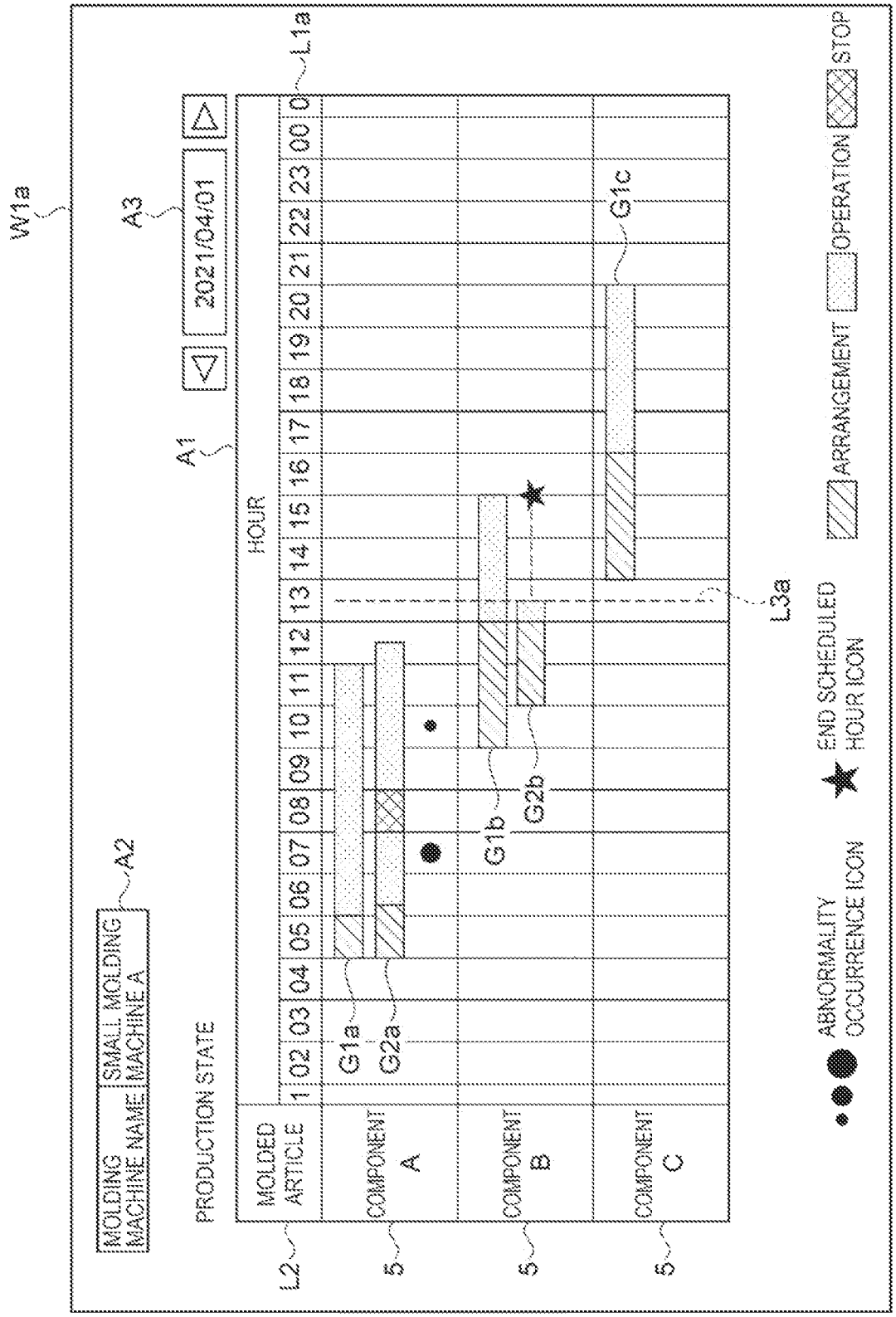
FIG. 3 is an explanatory diagram showing an example of a management screen displayed by a display section according to a second embodiment.

As shown in FIG. 3, in the second embodiment, the start point of the common time axis L1a and the end point of the common time axis L1a are displayed based on the present hour. Specifically, in the production state display region A1, a present hour display line L3a indicating the present hour is placed substantially in the center of the production state display region A1. As the start point of the common time axis L1a, an hour delayed by a predetermined time based on the present hour, for example, an hour before twelve hours is displayed. As the end point of the common time axis L1a, an hour advanced by the predetermined time based on the present hour, for example, an hour after twelve hours is displayed. In other words, in this embodiment, the present hour display line L3a is fixed in the production state display region A1. The display section 44 changes and displays, according to elapse of time, the hours displayed at the start point and the end point of the common time axis L1a.

According to this embodiment, effects described below can be obtained in addition to the effects in the first embodiment.

Since the present hour display line L3a is fixed and the times displayed at the start point and the end point of the common time axis L1a change according to elapse of time, the operator can more easily grasp the production plans G1b and G1c, which are production plans after the present date and time. Accordingly, the operator can appropriate cope with the production plans G1b and G1c after the present date and time. Therefore, work efficiency is improved.

3. Third Embodiment

A management screen W1b displayed by the display section 44 of the molding machine management system 1 according to a third embodiment is explained with reference to FIG. 4. The same components as the components in the first embodiment are denoted by the same reference numerals and signs and explanation of the components is omitted. The management screen W1b according to the third embodiment is the same as the management screen W1 in the first embodiment except that the management screen W1b includes a production indicator display region A5 and a molding machine operation state display region A6.

First, the production indicator display region A5 is explained.

The production indicator display region A5 is a region where indicators for managing a production state of the injection molding machine 2 for each of molded articles are displayed. As shown in FIG. 4, the production indicator display region A5 is placed adjacent to the production state display region A1.

In this embodiment, the display section 44 displays, in the production indicator display region A5, as the indicators for managing the production state of the injection molding machine 2 for each of the molded articles, a number of produced articles 51, a scheduled number of produced articles 52, a production ratio 53, a defect ratio 54, and a cycle time 55 to correspond to the identification indicators 5 for identifying the molded articles displayed on the molded article axis L2. The number of produced articles 51 represents, for each of the molded article, a quantity of non-defective products among molded products produced by the injection molding machine 2 up to the present date and time. The scheduled number of produced articles 52 represents, for each of the molded articles, a quantity of non-defective products of molded products planned in advance in a production plan. The production ratio 53 represents, in a percentage, a ratio of the number of produced articles 51 to the scheduled number of produced articles 52. The production ratio 53 for each of the molded articles is called progress ratio for each of the molded articles as well. The defect ratio 54 represents, for each of the molded articles, in ppm (part per million), a quantity of defective products with respect to a quantity of molded products produced by the injection molding machine 2 up to the present hour. The cycle time 55 is a unit time from a start to an end of one injection molding of the molded products for each of the molded articles. The cycle time 55 may be set to a predetermined value stored in advance for each of the molded articles or may be calculated based on a production result in the past or the production result G2b at present for each of the molded articles.

The molding machine operation state display region A6 is explained.

The molding machine operation state display region A6 is a region where indicators for managing an operation state of the injection molding machine 2 are displayed. The indicators displayed in the molding machine operation state display region A6 are different from the indicators displayed in the production indicator display region A5 in that the indicators displayed in the molding machine operation state display region A6 are indicators for totaling all molded articles produced by the injection molding machine 2 in a certain period and managing an operation state of the injection molding machine 2. In this embodiment, the certain period is one day indicated by the date input to the date selection region A3.

As shown in FIG. 4, the molding machine operation state display region A6 is placed in a space above the production state display region A1 and the production indicator display region A5 on the management screen W1b.

In this embodiment, the display section 44 displays a production progress ratio 61, equipment overall efficiency 62, an operation ratio 63, a defect ratio in process 64, and a material residual amount 65 in the molding machine operation state display region A6. The production progress ratio 61 represents, in a percentage, a cumulative total of the number of produced articles 51 of molded products produced by the injection molding machine 2 up to the present hour with respect to a cumulative total of the scheduled number of produced articles 52 of molded product planned in advance in a production plan. The equipment overall efficiency 62 is an indicator defined as an indicator indicating a degree of use efficiency of equipment in the Japan Industrial Standard Z8141:2001 and is calculated based on a time operation ratio indicating the magnitude of a stop loss, a performance operation ratio indicating the magnitude of a performance loss, and a non-defective product ratio indicating the magnitude of a defect loss that hinder equipment efficiency. The operation ratio 63 represents, in a percentage, an actual operation time with respect to an operation time planned in advance of the injection molding machine 2. The defect ratio in process 64 represents a cumulative total of a quantity of defective products in ppm (part per million) with respect to a cumulative total of a quantity of molded products produced by the injection molding machine 2 up to the present hour. The material residual amount 65 represents, in a percentage, the weight of a material in the hopper 22 at the present hour with respect to the weight of the material input in the hopper 22 of the injection molding machine 2 before a molding start by the injection molding machine 2.

According to this embodiment, effects described below can be obtained in addition to the effects in the first embodiment.

The display section 44 displays, in the production indicator display region A5, the number of produced articles 51, the scheduled number of produced articles 52, the production ratio 53, the defect ratio 54, and the cycle time 55 as the indicators for managing the production state for each of the molded articles. Consequently, the operator can grasp a production state for each of the molded articles as a specific numerical value. Therefore, the operator can more appropriately cope with the production state. Therefore, work efficiency is improved.

In this embodiment, the number of produced articles 51, the scheduled number of produced articles 52, the production ratio 53, the defect ratio 54, and the cycle time 55 are displayed. However, it is unnecessary to display all of these indicators. At least one of the indicators may be displayed.

In this embodiment, the number of produced articles 51, the scheduled number of produced articles 52, the production ratio 53, the defect ratio 54, and the cycle time 55 are displayed. However, production indicators other than these indicators may be displayed. For example, a molding end scheduled hour for each of the molded articles may be displayed as numerical value information.

In this embodiment, the management screen W1b includes both of the production indicator display region A5 and the molding machine operation state display region A6. However, the molding machine operation state display region A6 may be absent.

4. Fourth Embodiment

A management screen W1c displayed by the display section 44 of the molding machine management system 1 according to a fourth embodiment is explained with reference to FIG. 5. The same components as the components in the first embodiment are denoted by the same reference numerals and signs and explanation of the components is omitted. The management screen W1c according to the fourth embodiment is the same as the management screen W1 in the first embodiment except that the display section 44 displays post-arrangement planned periods P22a, P22b, and P22c and a post-arrangement result period M22a.

Figure 5:
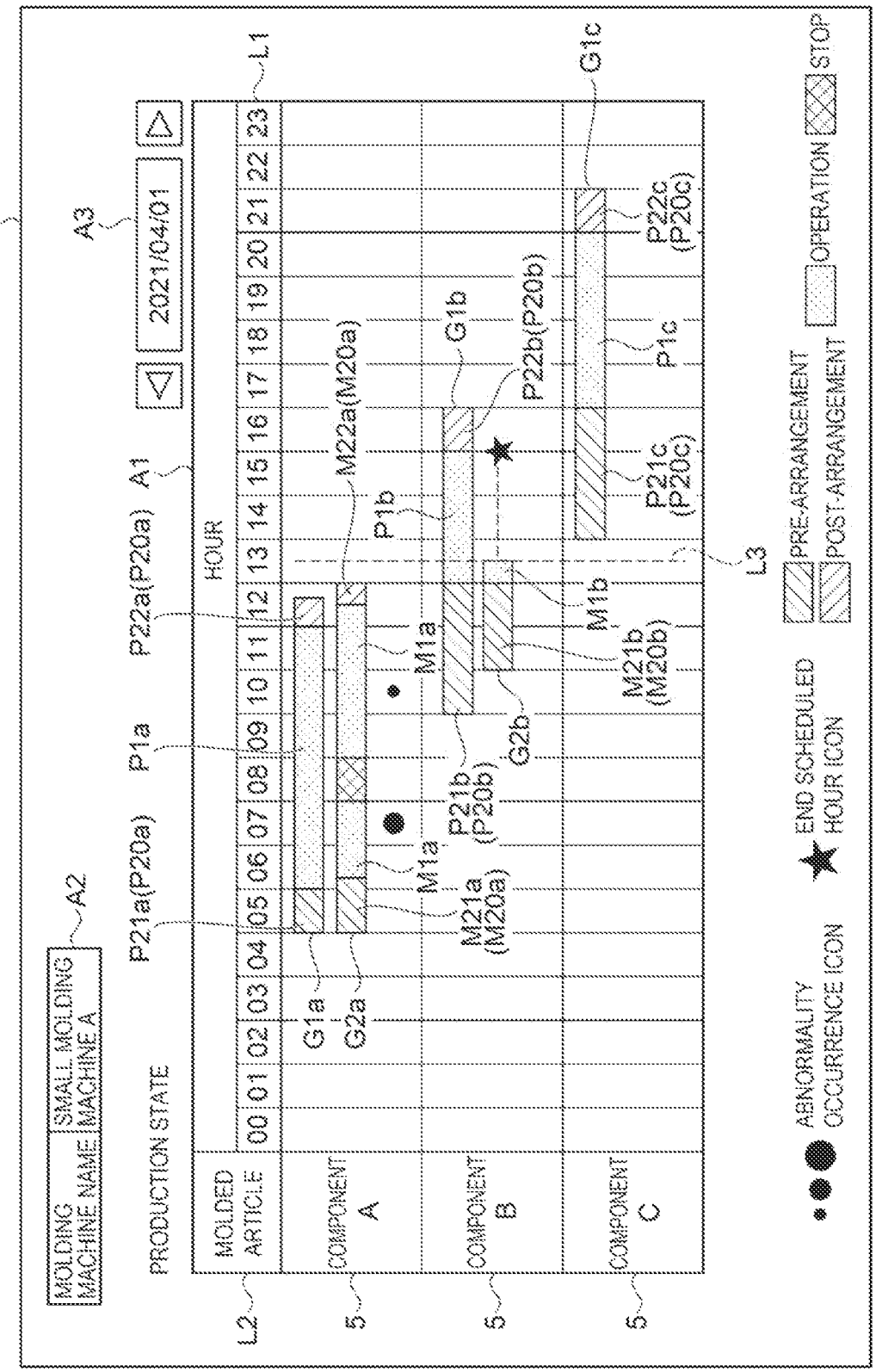
FIG. 5 is an explanatory diagram showing an example of a management screen displayed by a display section according to a fourth embodiment.

As shown in FIG. 5, an arrangement planned period P20b for the component B, which is the second molded article with respect to the component A, includes a pre-arrangement planned period P21b and the post-arrangement planned period P22b. The pre-arrangement planned period P21b in this embodiment is a period equivalent to the arrangement planned period P2b in the first embodiment.

The display section 44 displays the pre-arrangement planned period P21b for the component B, which is the second molded article, before the molding planned period P1b for the component B on the common time axis L1 and displays the post-arrangement planned period P22b for the component B after the molding planned period P1b for the component B on the common time axis L1. In FIG. 5, the pre-arrangement planned period P21b for the component B is displayed in meshing by lines slanting upward to the right and the post-arrangement planned period P22b for the component B is displayed in meshing by lines slanting downward to the right.

Similarly, an arrangement planned period P20a for the component A, which is the first molded article with respect to the component B, includes a pre-arrangement planned period P21a and the post-arrangement planned period P22a. An arrangement planned period P20c for the component C includes a pre-arrangement planned period P21c and the post-arrangement planned period P22c. The pre-arrangement planned period P21a and the pre-arrangement planned period P21c in this embodiment are respectively periods equivalent to the arrangement planned period P2a and the arrangement planned period P1c in the first embodiment.

The display section 44 displays the respective pre-arrangement planned periods P21a and P21c for the component A and the component C before the respective molding planned periods P1a and P1c for the component A and the component C on the common time axis L1 and displays the respective post-arrangement planned periods P22a and P22c for the component A and the component C after the respective molding planned periods P1a and P1c for the component A and the component C on the common time axis L1. In FIG. 5, the respective pre-arrangement planned periods P21a and P21c for the component A and the component C are displayed in meshing by lines slanting upward to the right and the respective post-arrangement planned periods P22a and P22c for the component A and the component C are displayed in meshing by lines slanting downward to the right.

In FIG. 5, the molding planned periods P1a, P1b, and P1c are displayed in meshing by halftone dots. In this way, the pre-arrangement planned periods P21a, P21b, and P21c, the molding planned periods P1a, P1b, and P1c, and the post-arrangement planned periods P22a, P22b, and P22c are respectively displayed in different display forms. The different display forms are not limited to the kinds of the meshing. Colors, shapes, or the like may be differentiated.

As shown in FIG. 5, an arrangement result period M20a for the component A, which is the first molding article with respect to the component B, includes a pre-arrangement result period M21a and the post-arrangement result period M22a. The pre-arrangement result period M21a in this embodiment is a period equivalent to the arrangement result period M2a in the first embodiment.

The display section 44 displays the pre-arrangement result period M21a for the component A, which is the first molded article, before the molding result period M1a for the component A on the common time axis L1 and displays the post-arrangement result period M22a for the component A after the molding result period M1a for the component A on the common time axis L1. In FIG. 5, the pre-arrangement result period M21a for the component A is displayed in meshing by lines slanting upward to the right and the post-arrangement result period M22a for the component A is displayed in meshing by lines slanting downward to the right.

The display section 44 can display a pre-arrangement result period and a post-arrangement result period about the component B and the component C in the same manner as about the component A. However, in FIG. 5, since the molding result period M1b for the component B has not ended at the present hour, in an arrangement result period M20b for the component B, only a pre-arrangement result period M21b is displayed and a post-arrangement result period for the component B is not displayed. Since production of the component C has not started at the present hour, a production result including a pre-arrangement result period and a post-arrangement result period for the component C is not displayed.

In FIG. 5, the molding result periods M1a and M1b are displayed in meshing by halftone dots. In this way, the pre-arrangement result periods M21a and M21b, the molding result periods M1a and M1b, and the post-arrangement result period M22a are respectively displayed in different display forms. The different display forms are not limited to the kinds of the meshing. Colors, shapes, or the like may be differentiated.

According to this embodiment, effects described below can be obtained in addition to the effects in the first embodiment.

The display section 44 displays the respective pre-arrangement planned periods P21a, P21b, and P21c for the component A, the component B, and the component C, which are the second molded articles, before the respective molding planned periods P1a, P1b, and P1c on the common time axis L1 and displays the respective post-arrangement planned periods P22a, P22b, and P22c for the component A, the component B, and the component C after the respective molding planned periods P1a, P1b, and P1c on the common time axis L1. Consequently, the operator can grasp post-arrangement in addition to pre-arrangement. Therefore, work efficiency is further improved.

What is claimed is:

1. A molding machine management system comprising:
an injection molding machine configured to alternatively produce a first molded article and a second molded article produced after the first molded article;
a display configured to display, along a common time axis, identification indicators for identifying the first molded article and the second molded article;
a memory configured to store a program; and
a processor configured to execute the program so as to:
receive a production result for the first molded article including a molding result period for the first molded article and an arrangement result period for the first molded article from the injection molding machine;
read, from the memory, a production plan for the second molded article including a molding planned period for the second molded article and an arrangement planned period for the second molded article;
receive an event corresponding to an abnormality from the injection molding machine;
read, from the memory, a scheduled end time of the production plan for the second molded article; and
cause the display to display:
the production result for the first molded article and the production plan for the second molded article in parallel along the common time axis;
a current timeline extending perpendicular to the common time axis;
a first mark corresponding to the event of the abnormality directly adjacent to the production result for the first molded article; and
a second mark corresponding to the scheduled end time on a line extending from the production plan for the second molded article in parallel along the common time axis.

2. The molding machine management system according to claim 1,
wherein the production result for the first molded article includes a molding planned period for the first molded article.

3. The molding machine management system according to claim 2,
wherein the processor is configured to cause the display to display the molding result period for the first molded article and the molding planned period for the first molded article in different display forms.

4. The molding machine management system according to claim 1,
wherein the processor is configured to cause the display to:
display a production plan for the first molded article including a molding planned period for the first molded article and an arrangement planned period for the first molded article along the common time axis; and
display the production plan for the first molded article and the production plan for the second molded article in parallel along the common time axis.

5. The molding machine management system according to claim 1,
wherein the production result for the first molded article includes a molding machine operation period in which the injection molding machine operates and a molding machine stop period in which the injection molding machine stops, and
the processor is configured to cause the display to display the molding machine operation period and the molding machine stop period in different display forms.

6. The molding machine management system according to claim 1,
wherein the processor is configured to cause the display to display a start point of the common time axis and an end point of the common time axis in response to a present date and time.

7. The molding machine management system according to claim 1,
wherein the processor is configured to cause the display to display, with respect to the first molded article, at least any one of a number of produced articles, a schedule number of produced articles, a production ratio, a defect ratio, and a cycle time.

8. The molding machine management system according to claim 1,
wherein the arrangement planned period for the second molded article includes a pre-arrangement planned period carried out before a start of the molding planned period for the second molded article and a post-arrangement planned period carried out after an end of the molding planned period for the second molded article, and
the processor is configured to cause the display to:
display the pre-arrangement planned period before the molding planned period for the second molded article along the common time axis; and
display the post-arrangement planned period after the molding planned period for the second molded article along the common time axis.

* * * * *